(12) United States Patent
Toivola et al.

(10) Patent No.: US 8,720,278 B1
(45) Date of Patent: May 13, 2014

(54) METHOD OF DETECTING INCONSISTENCIES IN COMPOSITE STRUCTURES AND STRESS SENSITIVE COATINGS USED THEREIN

(75) Inventors: Ryan Toivola, Seattle, WA (US); Brian D. Flinn, Seattle, WA (US); Zhengwei Shi, Shoreline, WA (US); Sei-Hum Jang, Mukilteo, WA (US); Gary E. Georgeson, Tacoma, WA (US); Alex Kwan-yue Jen, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 307 days.

(21) Appl. No.: 13/310,333

(22) Filed: Dec. 2, 2011

Related U.S. Application Data

(60) Provisional application No. 61/482,733, filed on May 5, 2011.

(51) Int. Cl.
*G01B 11/16* (2006.01)

(52) U.S. Cl.
USPC .............................................. 73/762; 73/775

(58) Field of Classification Search
USPC .......................................... 73/760, 762, 775
See application file for complete search history.

(56) References Cited

U.S. PATENT DOCUMENTS

| | | | | |
|---|---|---|---|---|
| 4,015,465 | A | | 4/1977 | Scott |
| 4,436,999 | A | * | 3/1984 | Kern .............................. 250/302 |
| 4,492,121 | A | * | 1/1985 | Lehto .............................. 73/705 |
| 4,509,370 | A | * | 4/1985 | Hirschfeld ....................... 73/705 |
| 4,784,811 | A | * | 11/1988 | Hirschfeld ..................... 264/1.27 |
| 4,921,770 | A | | 5/1990 | Murayama et al. |
| 5,132,530 | A | | 7/1992 | Groh et al. |
| 5,177,805 | A | * | 1/1993 | Groger et al. ..................... 385/12 |
| 5,300,356 | A | * | 4/1994 | Dempster et al. ............. 428/220 |
| 5,330,718 | A | * | 7/1994 | Hui et al. .................... 422/82.07 |
| 5,438,879 | A | | 8/1995 | Reda |
| 5,490,426 | A | * | 2/1996 | Shiga et al. ...................... 73/762 |
| 5,756,356 | A | | 5/1998 | Yanagi et al. |
| 5,817,945 | A | | 10/1998 | Morris et al. |
| 5,963,310 | A | * | 10/1999 | Brown et al. ................. 356/35.5 |
| 6,263,736 | B1 | | 7/2001 | Thundat et al. |
| 6,311,557 | B1 | | 11/2001 | Davis et al. |
| 6,327,030 | B1 | | 12/2001 | Ifju et al. |
| 6,442,316 | B1 | | 8/2002 | Rossi et al. |
| 6,808,804 | B2 | * | 10/2004 | Hotaka et al. ................. 428/357 |
| 7,037,973 | B2 | * | 5/2006 | Botros et al. ................... 524/555 |
| 7,127,950 | B2 | * | 10/2006 | Fonov et al. ..................... 73/800 |
| 7,246,570 | B2 | | 7/2007 | Weng et al. |

(Continued)

FOREIGN PATENT DOCUMENTS

JP 06313738 A2 11/1994

OTHER PUBLICATIONS

Cantwell et al., "An Assessment of the Impact Performance of CFRP Reinforced with High-strain Carbon Fibres," Composite Science and Technology, vol. 25, Issue 2, 1986, pp. 133-148.

(Continued)

*Primary Examiner* — Max Noori
(74) *Attorney, Agent, or Firm* — Yee & Associates, P.C.

(57) ABSTRACT

A coating system includes at least one polymeric coating layer comprising at least one fluorescent dye, wherein an optical behavior of the fluorescent dye changes as a function of a stress of the at least one polymeric coating.

25 Claims, 14 Drawing Sheets

(56) References Cited

U.S. PATENT DOCUMENTS

| | | | |
|---|---|---|---|
| 7,285,313 | B2 | 10/2007 | Kim et al. |
| 7,398,698 | B2 | 7/2008 | Griess et al. |
| 7,862,888 | B2 | 1/2011 | Toyama et al. |
| 8,038,815 | B2 | 10/2011 | Bailey et al. |
| 2006/0286407 | A1* | 12/2006 | Amano et al. ............. 428/690 |
| 2007/0100582 | A1 | 5/2007 | Griess et al. |
| 2008/0278722 | A1 | 11/2008 | Cunningham et al. |
| 2008/0293095 | A1* | 11/2008 | Jelinek ............................. 435/34 |
| 2009/0036304 | A1 | 2/2009 | Misner et al. |
| 2010/0227105 | A1 | 9/2010 | Dan-Jumbo et al. |
| 2010/0227106 | A1 | 9/2010 | Dan-Jumbo et al. |
| 2010/0227117 | A1 | 9/2010 | Dan-Jumbo et al. |
| 2010/0276064 | A1 | 11/2010 | Blanchard et al. |
| 2010/0276065 | A1 | 11/2010 | Blanchard et al. |
| 2011/0123712 | A1 | 5/2011 | Becker, IV et al. |
| 2011/0132523 | A1 | 6/2011 | Evens et al. |
| 2011/0316712 | A1 | 12/2011 | McIver et al. |

OTHER PUBLICATIONS

Morton et al., "Impact Response of Tough Carbon Fibre Composites," Composite Structures, vol. 13, Issue 1, 1989, pp. 1-19.

Kumar et al., "Delaminations of barely visible impact damage in CFRP laminates," Composite Structures, vol. 23, No. 4, 1993, pp. 313-318.

Poon et al., "Assessment of Impact Damage in Toughened Resin Composites," Theoretical and Applied Fracture Mechanics, vol. 13, Issue 2, 1990, pp. 81-97.

Van Keuren et al., "Three-dimensional thermal imaging using two-photon microscopy," Journal of Physics D.: Applies Physics, vol. 37, No. 20, Sep. 2004, pp. 2938-2943.

Drickamer et al., "Two Examples of Pressure Tuning Spectroscopy in Solid Polymeric Media," Ind. Eng. Chem Res., vol. 40, No. 14, Apr. 2001, pp. 3038-3041.

Woo et al., "Solvent Effects on the Two-Photon Absorption of Distyrylbenzene Chromophores," J. Am. Chem. Soc., vol. 127, Issue 42, Sep. 2005, pp. 14721-14729.

Birks, "Excimers," Rep. Prog. Phys., vol. 38, No. 8, 1975, pp. 903-974.

Wu et al., "Enhancement of Aggregation-Induced Emission in Dye-Encapsulating Polymeric Micelles for Bioimaging," Advanced Functional Materials, vol. 20, , Issue 9, May 2010, pp. 1413-1423.

Luo et al., "Aggregation-induced emission of 1-methyl-1,2,3,4,5-pentaphenylsilole," Chem. Commun., Aug. 2001, pp. 1740-1741.

Lowe et al., "Oligo(p-phenylene vinylene) Excimers as Molecular Probes: Deformation-Induced Color Changes in Photoluminescent Polymer Blends," Adv. Mater., Nov. 2002, vol. 14, No. 22, 1625-1629.

Yang et al., "Excimer Formation in Uniaxially Stretched Polymer Films," Journal of Applied Polymer Science, vol. 82, Issue 10, Dec. 2001, pp. 2347-2351.

"Technical Data, Desoprime CF/CA 7501," PPG Aerospace, Feb. 2010, 2 pages, accessed Sep. 23, 2011, http://www.ppg.com/coatings/aerospace/coatings/coatingsproducts/Documents/Desoprime_CF_CA_7501.pdf.

"Technical Data, Desothane HS Buffable Clear Topcoat CA 8800/B900," PPG Aerospace, Feb. 2010, 2 pages, accessed Sep. 23, 2011, http://www.ppg.com/coatings/aerospace/coatings/coatingsproducts/Documents/Desothane_HS_Buffable_Clear_Topcoat_CA_8800_B900.pdf.

"Standard Test Method for Assignment of the Glass Transition Temperature by Dynamic Mechanical Analysis," Designation E 1640-04, ASTM International, 5 pages.

Toivola et al., "Stress Sensitive Fluorescent Dyes for Damage Detection in Aerospace Primers & Coatings," SEMPE 2011 Conference and Exhibition Conference Program, Long Beach, CA, May 2011, 17 pages.

U.S. Appl. No. 13/310,539, filed Dec. 2, 2011, Georgeson et al.

Georgeson et al., "Monitoring Composite Manufacturing and Repair Processes Using Chromatic Film," U.S. Appl. No. 13/791,207, filed Mar. 8, 2013, 38 pages.

Georgeson et al., "Structural Repair Having Optical Witness and Method of Monitoring Repair Performance," U.S. Appl. No. 13/310,539, filed Dec. 2, 2011, 63 pages.

Office Action, dated Jun. 20, 2013, regarding U.S. Appl. No. 13/310,539, 25 pages.

Final office action dated Nov. 8, 2013 regarding U.S. Appl. No. 13/310,539, 15 pages.

\* cited by examiner

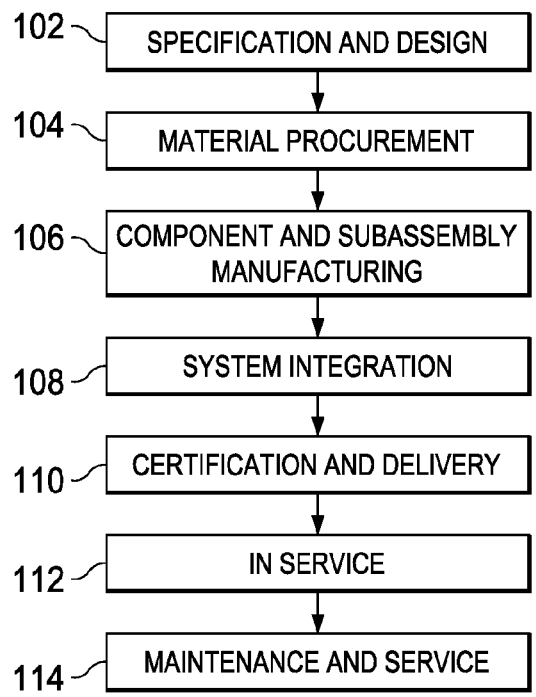
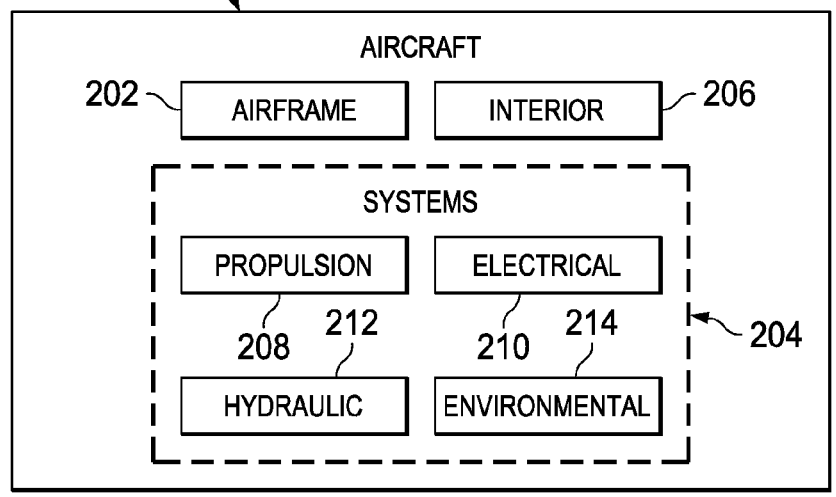

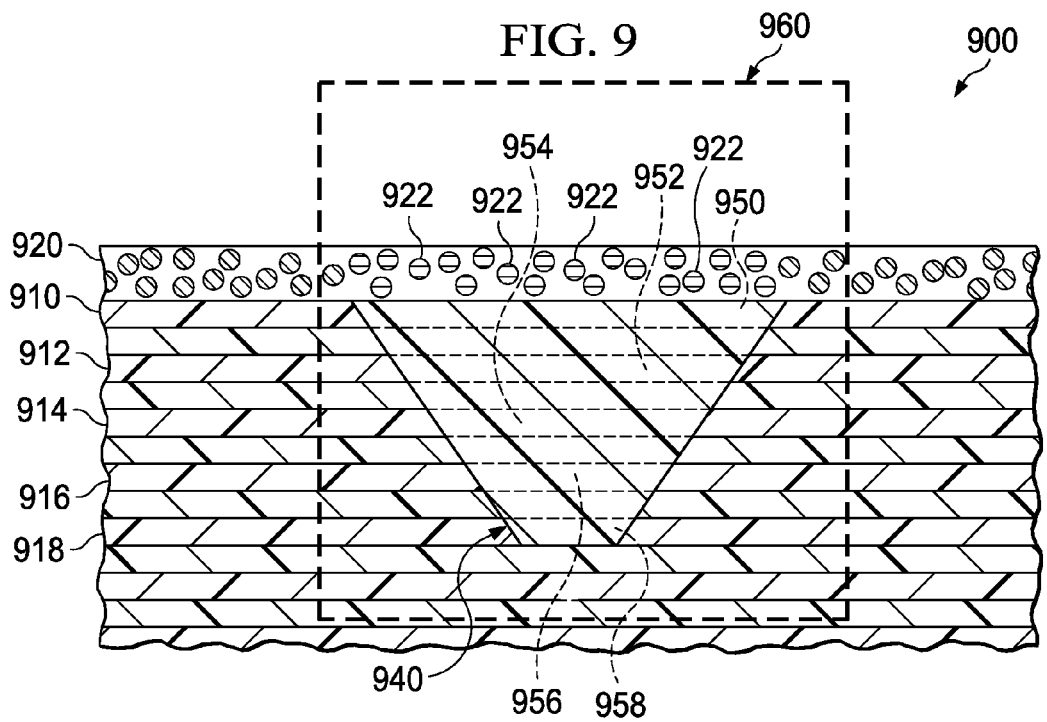
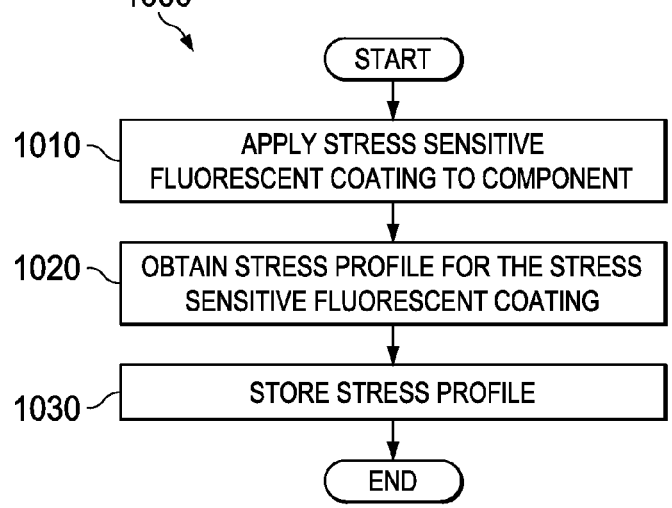

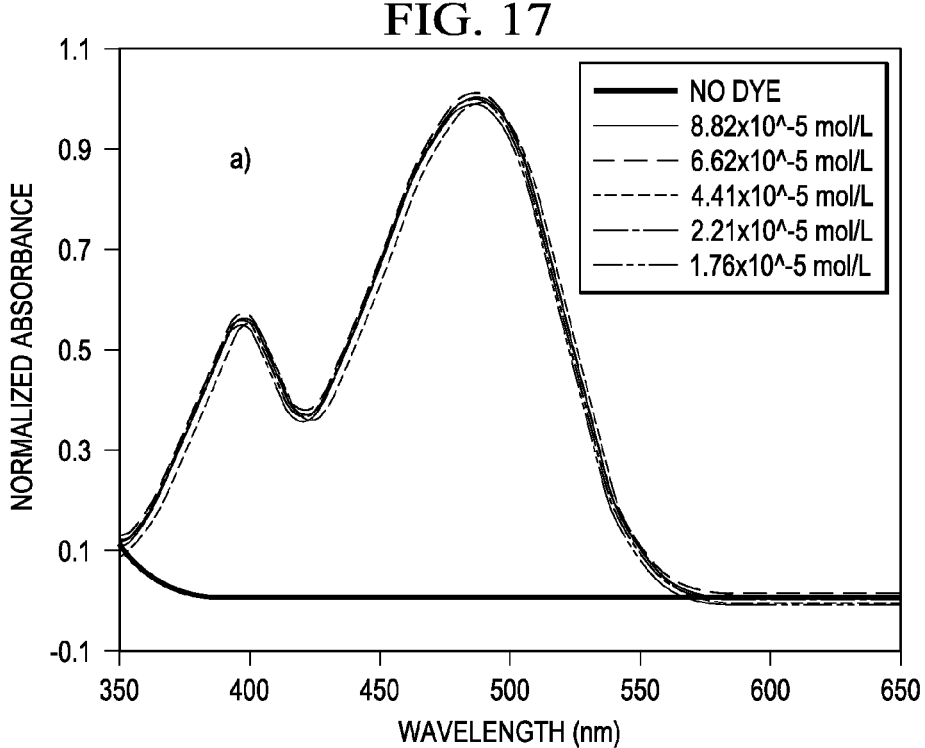
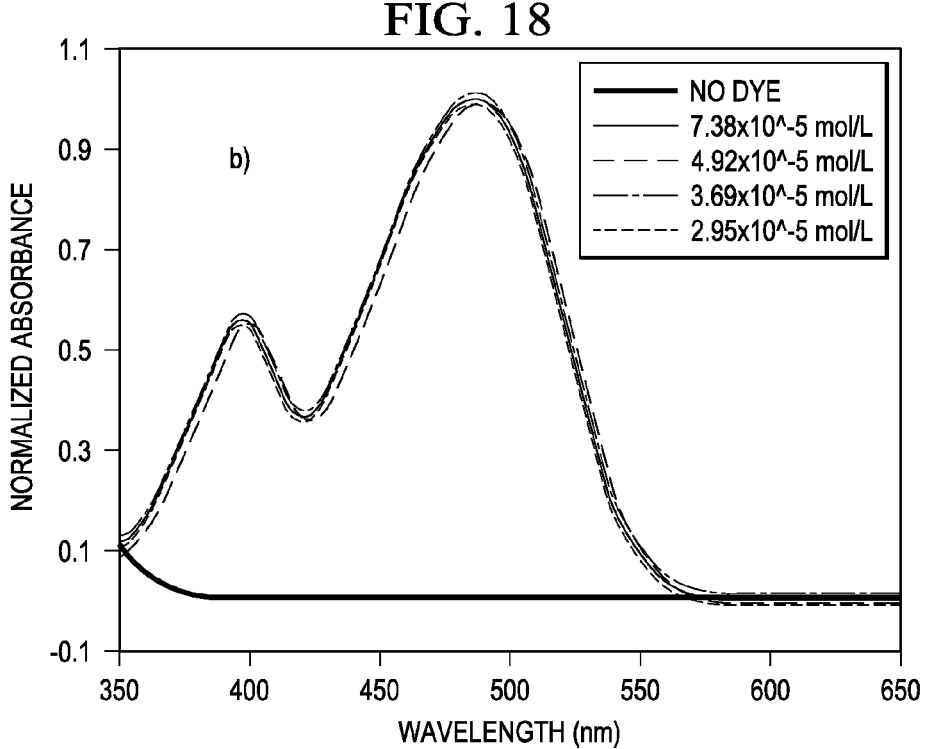

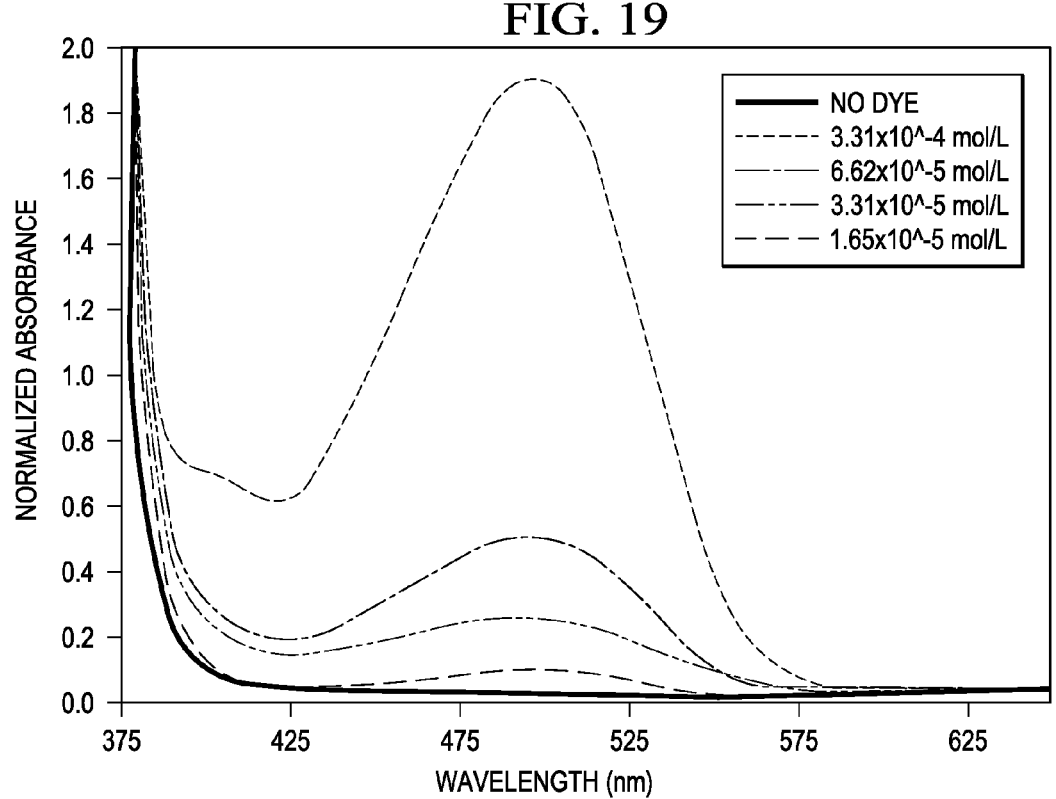

METHOD OF DETECTING INCONSISTENCIES IN COMPOSITE STRUCTURES AND STRESS SENSITIVE COATINGS USED THEREIN

CROSS REFERENCE TO RELATED APPLICATIONS

This application claims the benefit of Provisional U.S. Patent Application No. 61/482,733 filed May 5, 2011, which is incorporated by reference herein in its entirety. This application is also related to co-pending U.S. patent application Ser. No. 13/310,539 filed Dec. 2, 2011 which is incorporated by reference herein in its entirety.

BACKGROUND INFORMATION

1. Field

The present disclosure relates generally to manufacturing and servicing vehicles, especially aircraft. More particularly, the present disclosure relates to a coating and related method for detecting structural inconsistencies in composite aircraft parts.

2. Background

Parts fabricated from composite materials are sometimes chosen for use in the aerospace and aircraft industry because of their superior stiffness, strength, and weight in comparison to metal parts. In metal aircraft structures, a low-energy or low-velocity impact usually forms a dent on the part surface that may be easily detected during a visual inspection. In the case of composite parts however, impact events, such as ground vehicle collisions or strikes by runway debris on takeoff or landing, may not always leave an easily identifiable mark on the surface of the part. Such impact events, and the damage they cause are sometimes referred to as Barely Visible Impact Damage (BVID). Barely Visible Impact Damage resulting from low-velocity impact events may cause subsurface damage and delamination that extend beyond the impacted surface area.

Due to the opacity and inhomogeneity of composite parts, detection of subsurface damage can be challenging. Currently, ultrasonic C-scanning is often used to detect interior flaws and damage in composite parts. However, C-scans accurate enough to detect Barely Visible Impact Damage are time consuming and may require the aircraft to be taken out of service for a thorough inspection, resulting in undesirable aircraft downtime.

Accordingly, there is a need for aircraft structures having characteristics that facilitate easy detection of Barely Visible Impact Damage during routine in-service inspections. There is also a need for Barely Visible Impact Damage detection that may reduce the need for skilled inspection technicians, and the time required to perform the inspections.

SUMMARY

In one embodiment, a coating system is provided. The coating system comprises at least one polymeric coating layer including a fluorescent dye, wherein an optical behavior of the fluorescent dye changes as a function of a stress of the at least one polymeric coating.

In another embodiment, a composite structure comprises a plurality of laminated plies, including a top ply. The top ply includes a fluorescent dye having an optical behavior that changes as a function of a stress applied to the top ply.

In a further embodiment, a method of coating a vehicle is provided. The method comprises applying a primer coat, and applying a topcoat, wherein at least one of the primer layer and the topcoat layer includes a fluorescent dye having an optical behavior that changes as a function of a stress of the at least one polymeric coating.

In still another embodiment, a method is provided of detecting inconsistencies in a composite structure. The method comprises the steps of applying a stress sensitive coating to the structure and detecting changes in the stress sensitive profile of the stress sensitive coating.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is aircraft manufacturing and service method in which an advantageous embodiment may be implemented;

FIG. 2 is aircraft in accordance with an advantageous embodiment;

FIG. 9 is an illustration similar to FIG. 8, showing a repair of the Barely Visible Impact Damage in accordance with an advantageous embodiment;

FIG. 10 is flowchart for applying a stress sensitive fluorescent coating in accordance with an advantageous embodiment;

FIG. 17 shows the absorbance spectra for the tetra-butyl dimethyl silane functionalized stilbene dyes at various concentrations in the "thinner" precursor of the polyurethane coating in accordance with an advantageous embodiment;

FIG. 18 shows the absorbance spectra for the hydroxyl functionalized stilbene dyes at various concentrations in the thinner precursor of the polyurethane coating in accordance with an advantageous embodiment;

FIG. 19 shows the absorbance of the tetra-butyl dimethyl silane functionalized stilbene dyes in solid polyurethane films on glass substrates in accordance with an advantageous embodiment;

DETAILED DESCRIPTION

Figure 3:
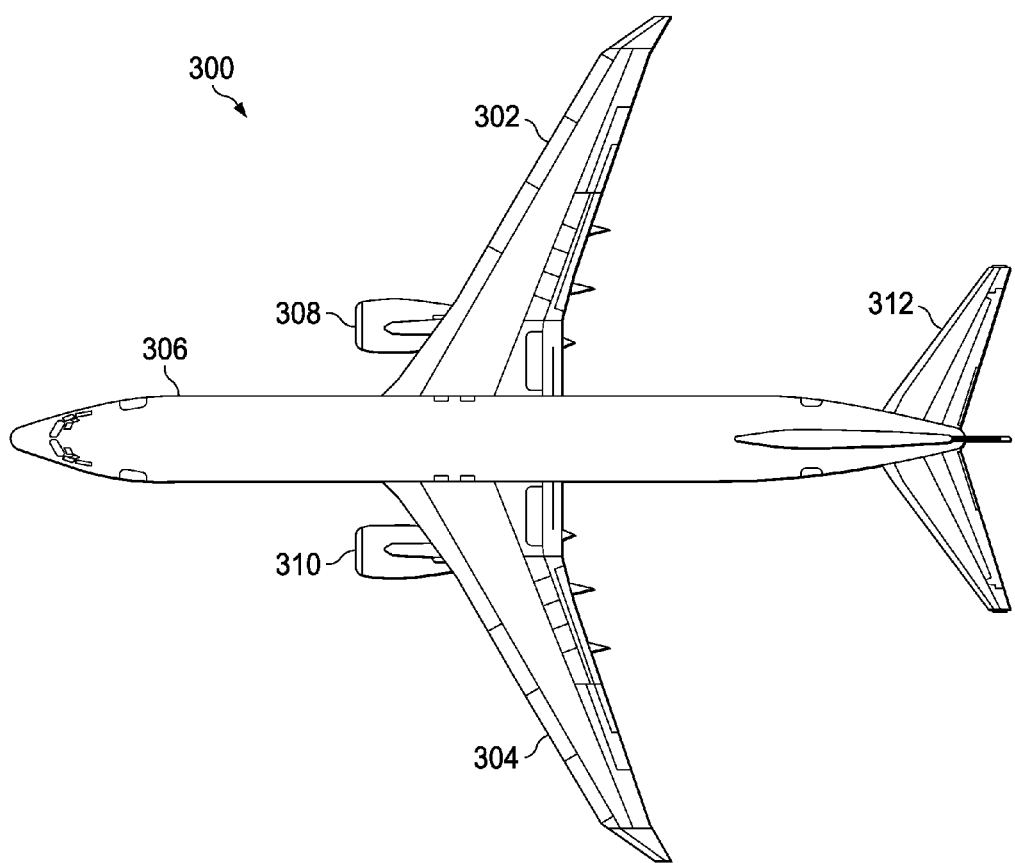
FIG. 3 is an illustration of an aircraft in accordance with an advantageous embodiment.

The disclosed embodiments relate to a method ad related coating that allow rapid, accurate and consistent detection of Barely Visible Impact Damage over wide areas that can be performed during routine aircraft service. The advantageous embodiments herein may be used to diagnose Barely Visible Impact Damage and quickly establish whether a more extensive inspection is necessary, as well guide such inspection efforts when required.

Referring to the drawings, embodiments of the disclosure may be described in the context of aircraft manufacturing and service method 100 as shown in FIG. 1 and aircraft 200 as shown in FIG. 2. Turning first to FIG. 1, during pre-production, aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include an airframe 202 with the plurality of systems 204 and the interior 206. Examples of the systems 204 include one or more of a propulsion system 208, an electrical system 210, a hydraulic system 212, and an environmental system 214. Any number of other systems may be included. Although an aerospace example is shown, different advantageous embodiments may be applied to other industries, such as the automotive industry.

Coatings and methods embodied herein may be employed during at least one of the stages of the aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in the component and subassembly manufacturing 106 in FIG. 1 may be fabricated or manufactured in a manner similar to components or subassemblies produced while the aircraft 200 is in service 112 in FIG. 1. As yet another example, a number of apparatus embodiments, method embodiments, or a combination thereof may be utilized during production stages, such as the component and subassembly manufacturing 106 and the system integration 108 in FIG. 1. A number, when referring to items, means one or more items. For example, a number of apparatus embodiments is one or more apparatus embodiments. The use of a number of the different advantageous embodiments may substantially expedite the assembly of and/or reduce the cost of aircraft 200. A number of apparatus embodiments, method embodiments, or a combination thereof may be utilized while the aircraft 200 is in service 112 and/or during maintenance and service 114 in FIG. 1. For example, the disclosed embodiments may be employed to perform rapid inspection of components and subassemblies for inadvertent damage due unplanned occurrences such as a tool dropped on the aircraft 200 during production stages 106, 198, a vehicle impact, or over-stressing of components of the aircraft 200 while the aircraft 200 is in service 112. A very large area of the aircraft 200, such as an outer skin (not shown) may be inspected quickly for signs of damage. Once the aircraft 200 is in service 112, rapid checks for damage using the disclosed embodiments may save the time and labor, compared to techniques that rely on hand-held or automated scanned inspections.

With reference now to FIG. 3, an illustration of an aircraft 300 is depicted in which an advantageous embodiment may be implemented. Aircraft 300 is a typical example of the aircraft 200 shown in FIG. 2, in which stress sensitive fluorescent coatings may be implemented. In this illustrative example, the aircraft 300 has wings 302 and 304 attached to a body 306. The aircraft 300 includes a wing mounted engine 308, a wing mounted engine 310, and a tail 312. Each of the wings 302, 304, the body 30, the wing mounted engine 308, the wing mounted engine 310, and the tail 312 may include components, such as an outer skin to which the disclosed stress sensitive fluorescent coatings may be applied.

Figure 4:
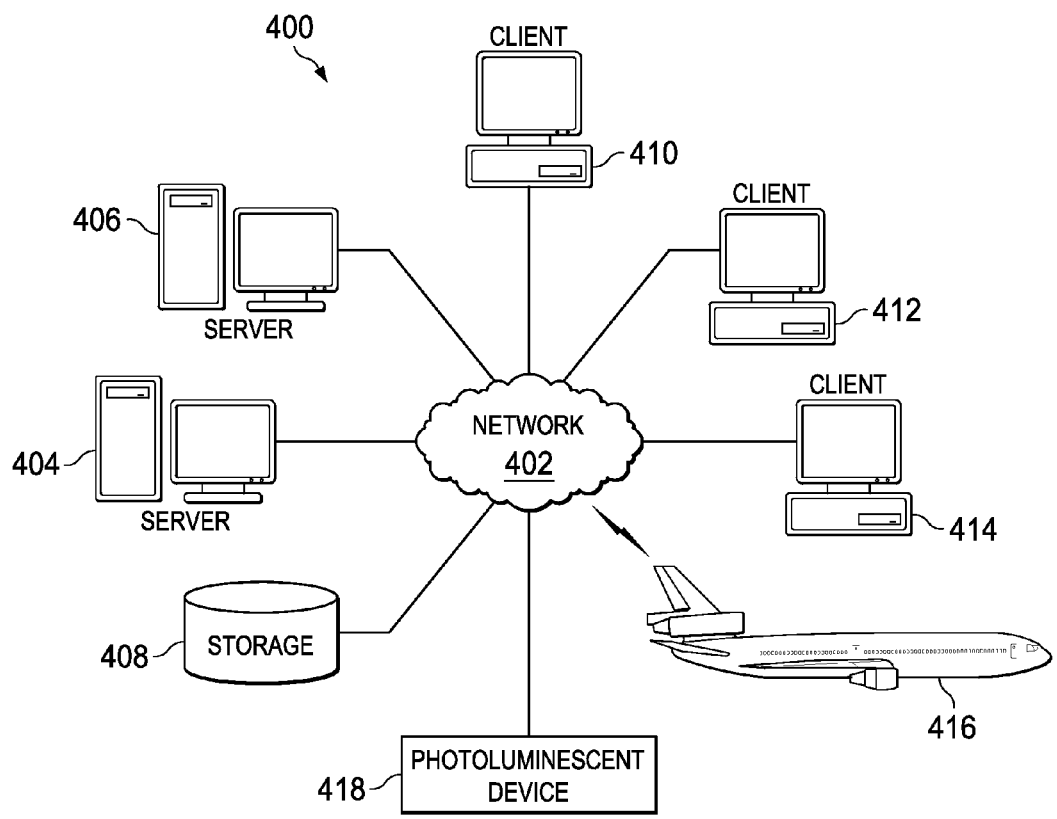
FIG. 4 is an illustration of a network of data processing systems in accordance with an advantageous embodiment.

The disclosed embodiments may be employed to develop inspection data used to manage a maintenance program for an aircraft or a fleet of aircraft. FIG. 4 is an illustration of a network data processing system 400 in which the advantageous embodiments may be implemented as part of an aircraft maintenance program. The network data processing system 400 comprises a network 402 which is the medium used to provide communications links between various devices and computers connected together within network data processing system 400. The network 402 may include connections, such as wire, wireless communication links, or fiber optic cables. In the illustrated example, servers 404, 406 connect to the network 402 along with a storage unit 408, and clients 410, 412, and 414. These clients 410, 412, and 414 may be, for example, personal computers or network computers. In the depicted example, the server 404 provides data, such as boot files, operating system images, and applications to the clients 410, 412, and 414. The clients 410, 412, and 414 are clients to the server 404 in this example. One or more aircrafts 416 are also clients that may exchange information with clients 410, 412, and 414.

In the illustrated depicted example, a photoluminescent device 418 connects to one or more of the servers 404, 406, the clients 410, 412, 414. The photoluminescent device 418 functions to collect photoluminescent quantum yield (PLQY) and fluorescence emission spectra. Photoluminescent device 418 can be for example, a Hamamatsu Absolute PL Quantum Yield Measurement System available from Hamamatsu K.K, US location Bridgewater, N.J. Photoluminescent device 418 can obtain fluorescence profiles from aircraft components and store those fluorescence profiles on one or more of the server 404, the server 406, the client 410, the client 412, and the client 414.

Figure 5:
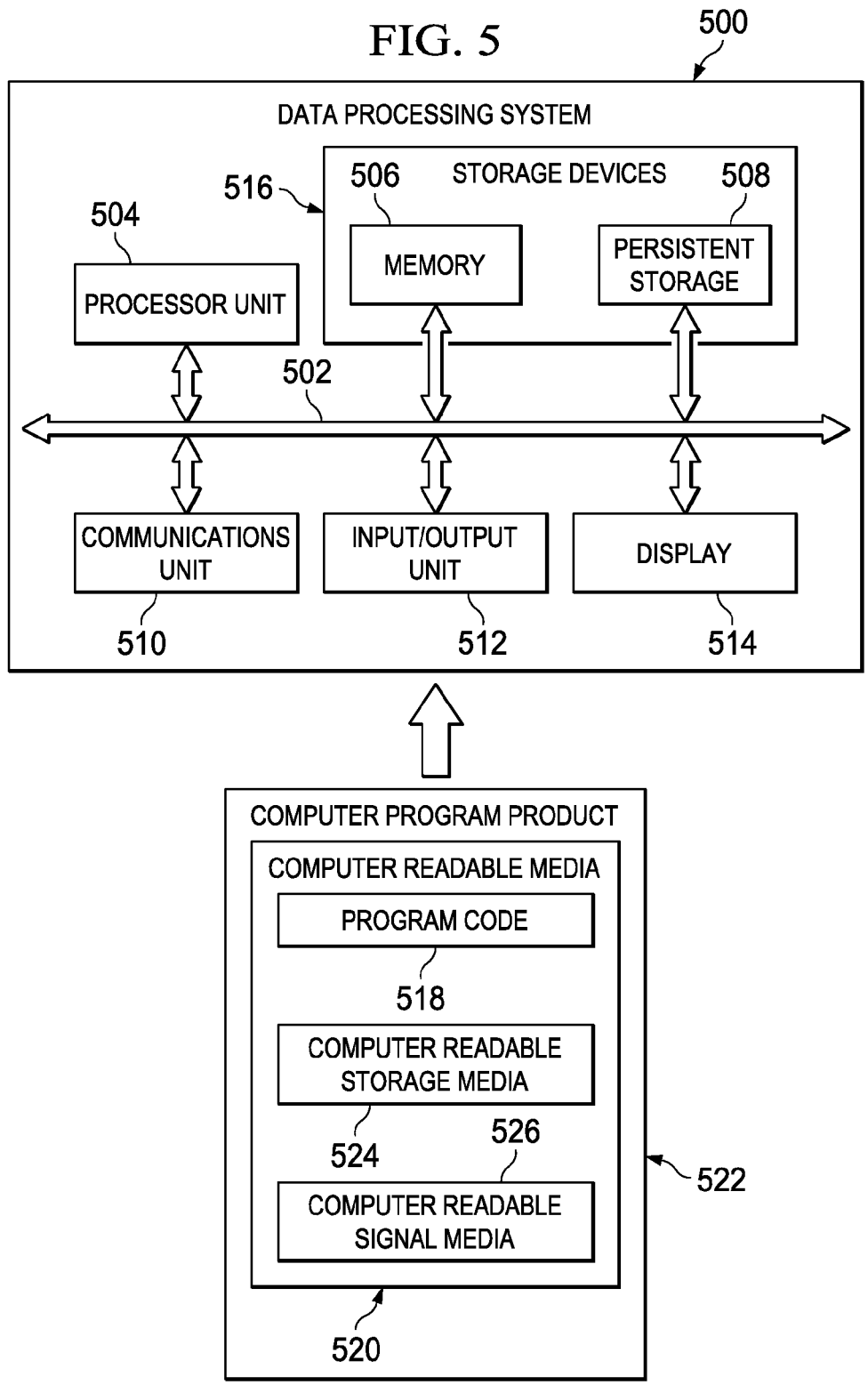
FIG. 5 is an illustration of a data processing system in accordance with an advantageous embodiment.

FIG. 5 illustrates a data processing system 500 that may be used to implement the servers and clients shown in FIG. 4, and is typical of a system that may be found on the aircraft 416 in FIG. 4. The data processing system 500 broadly comprises a processor unit 504, storage devices 506, 508, communications unit 510, input/output unit 512 and a display 514. The processor unit 504 executes instructions for software that may be loaded into the storage devices 506, 508. The communications unit 510 may provide communications through the use of either or both physical and wireless communications links. Input/output unit 512 allows for input and output of data with other devices that may be connected to the data processing system 500. The data processing system may employ one more computer programs 522 on computer readable media 520 which may include program code 518, computer readable storage media 524 and computer readable signal media 526.

As previously mentioned, the disclosed embodiments provide a method and related coating for rapid, consistent and accurate detection of Barely Visible Impact Damage that can be performed during routine aircraft service. The embodiments quickly establish whether a more extensive inspection is necessary, and guide such inspection efforts when they do occur.

The advantageous embodiments herein functionalize the coatings and topcoats that are applied to the surface of the aircraft during manufacturing, such as described in aircraft manufacturing and the service method 100 as shown in FIG. 1. Composite aircraft parts are sprayed with a compatible primer, then painted with the airline logo, then sprayed with a protective topcoat. Fluorescent dye molecules whose fluorescent behaviors change in response to external stress or deformation stimuli may be incorporated into these aircraft coatings to create a fluorescent sensor or "witness" coating for Barely Visible Impact Damage detection.

Highly efficient, aggregation-sensitive dyes with intrinsic dipole moments are selected and functionalized with end groups to either promote or prevent combination with coating polymer networks. When stress is applied to the coating, the positions of the dye molecules will shift as the polymer network displaces. The applied stress will change the dyes' aggregation behavior, and change their fluorescence behavior as a result.

The viscoelastic nature of polymer coatings and the complexity of molecular interactions make predicting the manner in which a dye will respond challenging. However, according to the solution provided by the disclosed embodiments, the manner in which the dye's fluorescence behavior changes is not important. Moreover, the disclosed dyes are not dependent on the presence of a particular type of stress—the dye is sensitive to both tensile and compressive stresses caused by impact in an impact area. Changes in fluorescent wavelength emission, either toward monomer-like behavior or dimer-like behavior, or changes in emission intensity due to quenching or aggregation-induced emission, are all detectable. By comparing an initial stress profile of aircraft coatings to subsequent stress profiles, stress changes due to Barely Visible Impact Damage can be determined.

Figure 6:
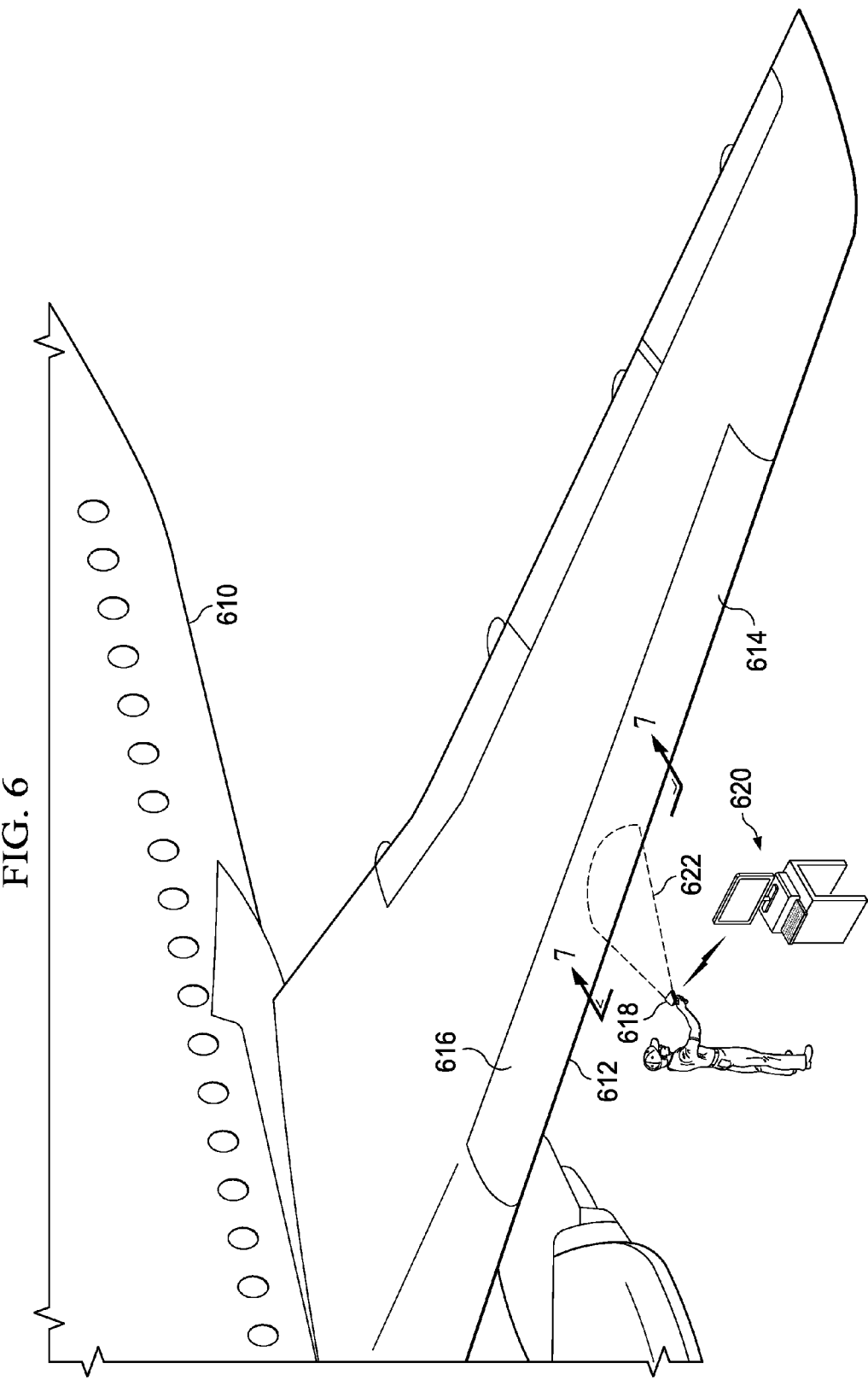
FIG. 6 is a system for determining stress inconsistencies in an aircraft coating in accordance with an advantageous embodiment.

Referring now to FIG. 6, an illustration of a system for determining stress inconsistencies in an aircraft coating is shown according to an advantageous embodiment. The stress inconsistencies can be, for example, localized in a composite part of the aircraft 610, caused by Barely Visible Impact Damage to the composite part. However, the stress inconsistencies may have other causes, such as, without limitation, overloading, or changes in a composite structure, such as ply delamination.

The aircraft 610 may be an aircraft similar to that previously described in connection with FIG. 3. The aircraft 610 includes a component 612 which may comprise, for example, a composite outer skin.

The component 612 has applied thereon, a stress sensitive fluorescent coating 614. The stress sensitive fluorescent coating 614 includes fluorescent dye molecules 616 whose fluorescent behaviors change in response to external stress or deformation stimuli.

The fluorescent dye molecules 616 display behavior that depends on their concentration within the local environment. If two dye molecules are in very close proximity to one another, they may share the energy of an absorbed photon between them by merging their electron density to form a dimer complex. The dimer complex absorbs and emits photons at differing wavelengths and with different efficiency than the single molecule or monomer. This phenomenon may also be referred to as aggregation.

The induced fluorescence of the fluorescent dye molecules 616 changes with deformation of the component 612. As the local environment of the fluorescent dye molecules 616 is deformed, the proximity of dye molecules to one another is changed, either increased or decreased depending on, for example, the molecular mobility of the fluorescent dye molecules 616. The probability of the fluorescent dye molecules 616 to form aggregates is then also changed, and as a result the fluorescence behavior of the fluorescent dye molecules 616 is changed as well.

In an advantageous embodiment, the fluorescent dye molecules 616 with intrinsic dipole moments are selected and incorporated into the stress sensitive fluorescent coating 614. When stress is applied to the stress sensitive fluorescent coating 614, the positions of the fluorescent dye molecules 616 shift as the polymer network displaces. This shift changes the aggregation behavior of the fluorescent dye molecules 616, and therefore also the fluorescence behavior as a result.

In one advantageous embodiment, the fluorescent dye molecules 616 are based on a modified stilbene-type fluorescent molecule customized with differing end groups designed to control their solubility and interaction with the polymer coating components of the stress sensitive fluorescent coating 614. The modified stilbene-type fluorescent molecule exhibits a large amount of conjugation that allows its electron density to move both within the molecule, for monomer-type excitation, and out-of-plane when in proximity with another stilbene, for dimer excitation.

A photoluminescent device 618 is used to collect Photoluminescent quantum yield (PLQY) and fluorescence emission spectra. The photoluminescent device 618 emits electromagnetic radiation 620, and identifies a fluorescence emission 618 from the fluorescent dye molecules 616 within the stress sensitive fluorescent coating 614. The fluorescence emission 618 is stored as a fluorescence profile 620 within a data processing system 622. The data processing system 620 can be, for example, one or more of the server 404, the server 406, the client 410, the client 412, and the client 414 of FIG. 4.

Figure 7:
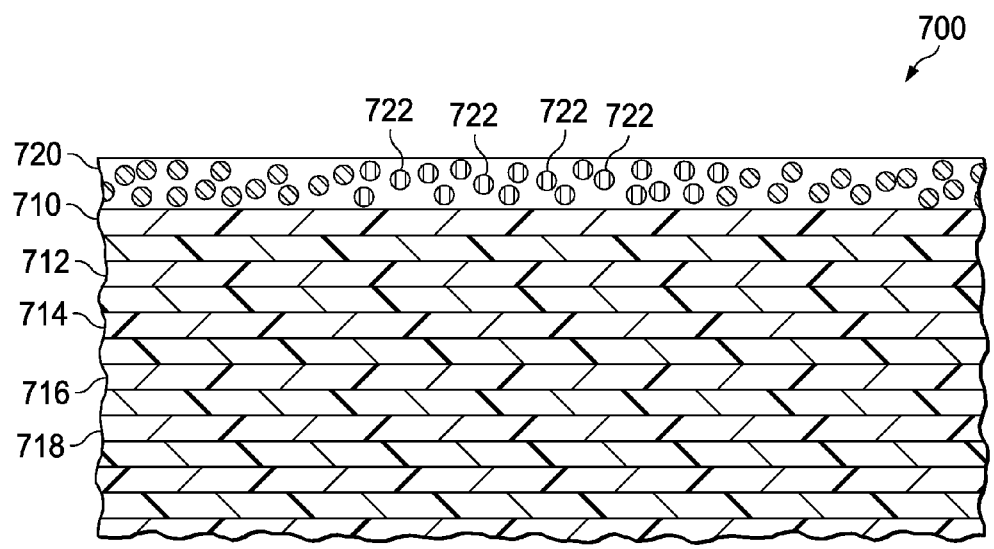
FIG. 7 is a cross section of a composite component in accordance with an advantageous embodiment.

Referring now to FIG. 7, a cross section of a composite component is shown according to an advantageous embodiment. The composite component 700 can be a component such as an aircraft outer skin. The composite component 700 may include layers 710-718 which form laminated plies. Each of the layers 710-718 may comprise a fibrous reinforcement that has been impregnated with a polymeric resin. Layers 710-718 are laminated together to form a substantially consolidated structure.

In one embodiment, a stress sensitive fluorescent coating 720 is applied to the composite component 700, and may comprise the stress sensitive fluorescent coating 614 shown in FIG. 6. The stress sensitive coating 720 may comprise a topcoat of paint or other material and/or an underlying primer coat that incorporates the fluorescent dye molecules 722. In some embodiments, the topcoat to which the stress sensitive coating 720 is applied may be a clearcoat substantially devoid of pigmentation. In still other embodiments, the fluorescent dye molecules 722 may be incorporated into the first layer (ply) 710 of resin during fabrication of the composite component 700.

The stress sensitive fluorescent coating 720 exhibits a stress profile based on the local environment of the fluorescent dye molecules 722. The fluorescent dye molecules 722 that are in a particular proximity to others of the fluorescent dye molecules 722 due to stress of the stress sensitive fluorescent coating 720 will exhibit fluorescence that is different than the fluorescent dye molecules 722 that are in a different proximity to others of the fluorescent dye molecules 722. In those applications where the fluorescent dye molecules 722 are incorporated into the first layer 710 of the component 700, the response of the coating 720 may be obscured by any overlying topcoat or primer coat that may be applied to the component 700. However, prior to the application of any topcoat and/or primer coat, such as during an intermediate stage of manufacturing or before the component 700 is placed in service, the reaction of the fluorescent dye molecules 722 in the first layer 710 may reveal damage or other phenomena that cause stress concentrations on the component 700.

Figure 8:
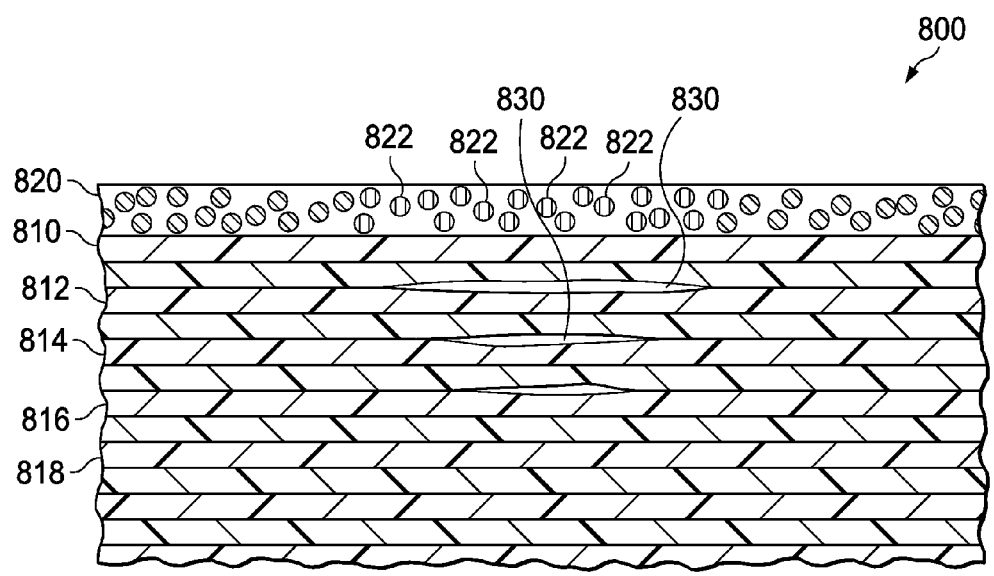
FIG. 8 is a cross section of a composite component that has experienced Barely Visible Impact Damage in accordance with an advantageous embodiment.

Referring now to FIG. 8, a cross section of a composite component 800 that has experienced an event causing an inconsistency that is barely visible to a visual inspection is shown according to an advantageous embodiment. The composite component 800 includes a plurality of laminated layers 810-818 of fiberous reinforcement impregnated with a polymeric resin. The stress sensitive fluorescent coating 820 is applied to the surface of the composite component 800. The stress sensitive fluorescent coating 820 is the stress sensitive fluorescent coating 614 of FIG. 6. The composite component 800 includes inconsistencies 830 that are barely visible to a visual inspection. The inconsistencies 830 may include, for example, delaminations of one or more of the layers 810-818, undesired conditions in resins of the composite component 800, and/or undesired conditions in fiber reinforcement of the composite component 800.

The impact or other event that results in the inconsistencies 830 causes changes in a stress profile of the stress sensitive fluorescent coating 820. Changes in the stress profile may also be detected which are indicative of an inconsistency caused by other events, such as ply delamination. The induced fluorescence of the fluorescent dye molecules 616 therefore also changes stress profile of the stress sensitive fluorescent coating 820. As the local environment of the fluorescent dye molecules 822 is deformed, the proximity of dye molecules to one another is changed, either increasing or decreasing depending on, for example, the molecular mobility of the fluorescent dye molecules 616. The probability of the fluorescent dye molecules 616 to form aggregates is then also changed, and as a result, the fluorescence behavior of the fluorescent dye molecules 616 is changed as well.

The viscoelastic nature of the stress sensitive fluorescent coating 820 and the complexity of molecular interactions of the fluorescent dye molecules 822 make predicting the manner in which a dye will respond difficult. However, changes in fluorescent wavelength emission, either toward monomer-like behavior or dimer-like behavior, or changes in emission intensity due to quenching or aggregation-induced emission, are all detectable. By comparing an initial stress profile of the stress sensitive fluorescent coating 720 of FIG. 7 to the subsequent stress sensitive fluorescent coating 820, stress changes due to Barely Visible Impact Damage to an aircraft can be determined.

Referring now to FIG. 9, the disclosed stress sensitive fluorescent coating 920 may be employed to monitor changes in a repair or rework area 960 within a component 900 which may comprise, for example and without limitation, a composite skin 900. FIG. 9 illustrates a cross section of the skin 900 after having undergone a process to repair one or more inconsistencies, such as Barely Visible Impact Damage. The repair area 960 comprises a scarf 940 in the skin 900 that is covered and filled with an adhesively bonded repair patch comprising laminated plies 950-958 which may be aligned with the layers 910-918 of the skin 900. In this example, the stress sensitive fluorescent coating 920 is applied to the surface of the skin 900, overlying the repair patch. The stress sensitive fluorescent coating 920 may be incorporated into a topcoat paint or primer that is applied over the entire area of the skin 900, as during repainting of the aircraft 300 (FIG. 3), or only over a portion of the area of the skin 900. The stress profile for the skin 900, including that of the repair area 960, may be different respectively before and after impact damage producing the inconsistencies. Therefore, after performing a repair or other rework operation, a new stress profile is obtained for the composite skin 900. The new stress profile can then be input and stored in a data processing system, such as the data processing system 620 of FIG. 6, for use in subsequent inspection and servicing of the aircraft 300.

Referring now to FIG. 10, a flowchart for a process 1000 for applying a stress sensitive fluorescent coating is shown according to an advantageous embodiment. The stress sensitive fluorescent coating can be, for example, the stress sensitive fluorescent coating 614 of FIG. 6. Process 1000 begins at 1010 with the application of the stress sensitive fluorescent coating to a component. The component can be a component or subassemblies produced in component and subassembly manufacturing 106 processes shown in FIG. 1. The stress sensitive fluorescent coating applied at step 1010 may be, for example, the stress sensitive fluorescent coating 614 of FIG. 6. The stress sensitive fluorescent coating includes the fluorescent dye molecules 616 whose fluorescent behaviors change in response to external stress or deformation stimuli. The stress sensitive fluorescent coating may include a compatible primer, and a protective topcoat. At step 1020, an initial stress profile for the stress sensitive fluorescent coating is obtained using suitable equipment, such as the photoluminescent device 418 of FIG. 4. The stress profile essentially comprises a mapping of specific fluorescence of components to areas of that component exhibiting the fluorescence. At step 1030 the stress profile is stored in a data processing system, such as the data processing system 620 of FIG. 6.

Figure 11:
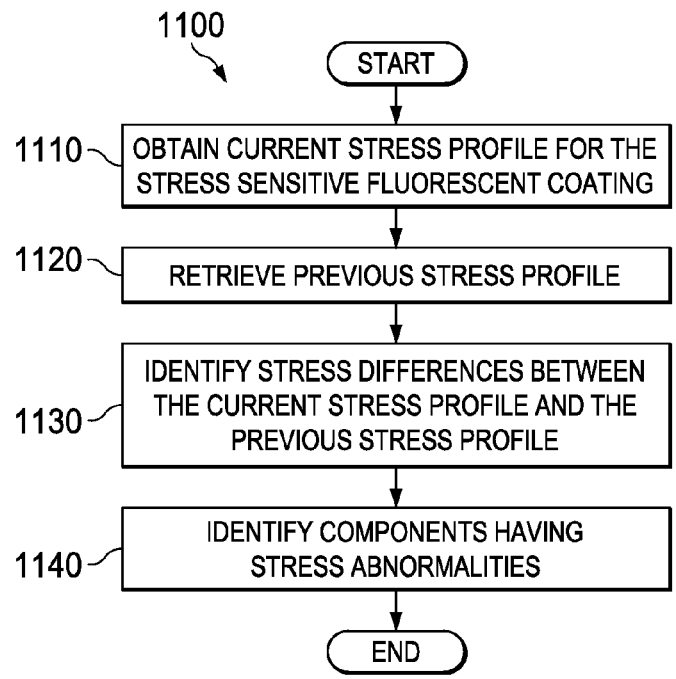
FIG. 11 is a flowchart of a process for determining stress inconsistencies in accordance with an advantageous embodiment.

Attention is now directed to FIG. 11, which illustrates a flowchart of a process for determining stress inconsistencies, according to an advantageous embodiment. The process 1100 begins at 1110 by obtains a current stress profile for the stress sensitive fluorescent coating. The current stress profile can be obtained using a photoluminescent device such as the photoluminescent device 418 of FIG. 4. The stress profile constitutes a map of specific fluorescence of components to areas of the component exhibiting the fluorescence. Based on the current stress profile obtained in step 1110, a previously obtained stress profile is retrieved at step 1120. The previous stress profile can be, for example, the initial stress profile obtained in step 1020 of FIG. 10. The previous stress profile can be obtained from an attached data processing system, such as the data processing system 620 of FIG. 6. Based on the previous stress profile retrieved at step 1120, stress differences between the current stress profile and the previous stress profile are identified at step 1130. Although not shown in FIGS. 10 and 11, a similar method may be employed to detect stress differences indicative of inconsistencies when the stress sensitive fluorescent dyes are incorporated into the top layer (ply) of a composite structure, as previously discussed. It should be noted here that while the method described above in connection with FIG. 11 relies on stress differences to indicate possible inconsistencies, such inconsistencies may be indicated directly by an obtained stress profile, without the need for referencing a previously obtained "baseline" stress profile.

As previously discussed, changes in fluorescent wavelength emission, either toward monomer-like behavior or dimer-like behavior, or changes in emission intensity due to quenching or aggregation-induced emission, are all detectable. By comparing an initial stress profile of aircraft coatings to subsequent stress profiles, stress changes due to Barely Visible Impact Damage can be determined. Based on any identified stress differences, components having stress inconsistencies corresponding to stress abnormalities may be identified at step 1140. It should be noted here that it may be possible to tailor the stress sensitive dyes to respond to preselected levels of stress, and to respond in various ways. For example, the dyes may be tailored to turn off, turn on or change color response when a preselected level of stress is induced in the stress sensitive fluorescent coating.

Figure 12:
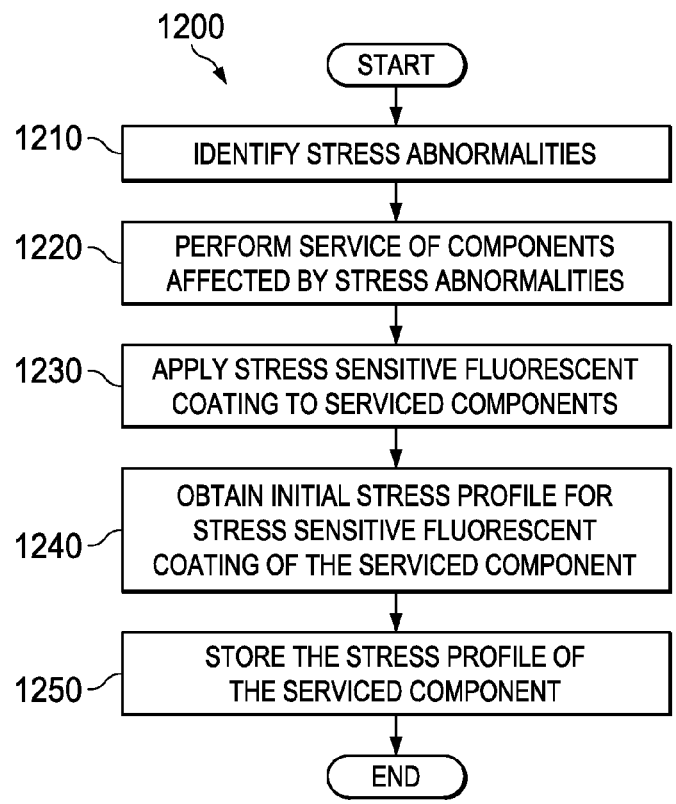
FIG. 12 is a flowchart for servicing a component having an inconsistent stress profile in accordance with an advantageous embodiment.

FIG. 12 is a flowchart of a method for servicing a component having an inconsistent stress profile, according to another embodiment. An inconsistent stress profile is a stress profile that differs from an initial stress profile, and therefore indicates the presence of inconsistencies that are barely visible to a visual inspection. The method comprises a process 1200 that begins at step 1210 by identifying stress inconsistencies in a component. The stress inconsistencies can be identified using a process such as process 1100 shown in FIG. 11. Based on the stress inconsistency identified in step 1210, any components affected by the stress inconsistency identified in step 1210 are serviced at step 1220. This service may include, for example, application of a scarf or a patch to the affected component, similar to the scarf 940 shown in FIG. 9. At step 1230, a stress sensitive fluorescent coating is applied to the component serviced in step 1220. The stress sensitive fluorescent coating can be, for example, the stress sensitive fluorescent coating 614 of FIG. 6. The stress sensitive fluorescent coating includes the fluorescent dye molecules 616 whose fluorescent behaviors change in response to external stress or deformation stimuli, such as that caused by an impact event. The stress sensitive fluorescent coating can include a compatible primer, and a protective topcoat.

Next, at step 1240, an initial stress profile is obtained for the stress sensitive fluorescent coating of the serviced component. The initial stress profile can be obtained using a photoluminescent device such as the photoluminescent device 418 of FIG. 4. The stress profile, which comprises a map of specific fluorescence of the serviced areas, is stored at step 1250 in a data processing system, such as the data processing system 620 of FIG. 6.

Example 1

A coating system of an epoxy based primer and a polyurethane topcoat was prepared on a 0.1 millimeter polyethylene terephthalate substrate. DesoPrime 7501, available from PPG Aerospace, Pittsburgh, Pa., was selected as the epoxy-based primer. DesoPrime 7501 comprises a curing agent and epoxy monomers. The curing agent is a mixture of paint solids, n-butyl alcohol, and aliphatic amines. The epoxy monomer comprises bisphenyl A and Epichlorohydrin-based resin in an acetone solvent.

A modified stilbene-type fluorescent dye was synthesized and prepared as a dry powder. The modified stilbene-type molecules were prepared having tetra-butyl dimethyl silane end groups. The selected end groups were selected to be non-reactive with other components of the epoxy-based primer. The modified stilbene-type fluorescent dye was added to the epoxy monomer in an amount of $8.2*10^{-4}$ mol/L of epoxy monomer solution, which was measured using a conventional fluorescence probe (probe 6 shown in FIG. 13).

The epoxy-based primer was prepared in a 1:1 mix ratio, by volume, of curing agent to epoxy monomers. The epoxy-based primer was then applied to the polyethylene terephthalate substrate at a thickness of 20-30 micrometers. The epoxy-based primer was then allowed to cure at room temperature over a period of 48 hours.

DesoThane 8800, available from PPG Aerospace, Pittsburgh, Pa., was selected as the polyurethane topcoat. DesoThane 8800 comprises a base component, and activator component, and a thinner component. The base component comprises 2-oxypanone, polymer with 2, 2-bis (hydroxymethyl)-1, 3-propanediol, methyl amyl ketone, and styrene acrylic polymer. The activator comprises a homopolymer of hexamethylene diisocyanate. The thinner component comprises methyl amyl ketone, and ethyl acetate.

The polyurethane topcoat was prepared in a 2:1:1 mix ratio, by volume, of base component to activator component, to thinner. The polyurethane topcoat was then applied to the epoxy-based primer at a thickness of 50-75 micrometers. The polyurethane topcoat was then allowed to cure at room temperature over a period of 48 hours.

Example 2

A coating system of an epoxy based primer and a polyurethane topcoat was prepared on a 0.1 millimeter polyethylene terephthalate substrate. DesoPrime 7501, available from PPG Aerospace, Pittsburgh, Pa., was selected as the epoxy-based primer. DesoPrime 7501 comprises a curing agent and epoxy monomers. The curing agent is a mixture of paint solids, n-butyl alcohol, and aliphatic amines. The epoxy monomer comprises bisphenyl A and Epichlorohydrin-based resin in an acetone solvent.

A modified stilbene-type fluorescent dyes were synthesized and prepared as a dry powder. The modified stilbene-type molecules were prepared having hydroxyl end groups.

The selected end groups were selected to be reactive with other components of the epoxy-based primer, and become part of the thermoset network formed as the epoxy cures. The modified stilbene-type fluorescent dye was added to the epoxy monomer in an amount of $1.28*10^{-3}$ mol/L of epoxy monomer solution which was measured using a conventional fluorescence probe 7 shown in FIG. 13.

The epoxy-based primer was prepared in a 1:1 mix ratio, by volume, of curing agent to epoxy monomers. The epoxy-based primer was then applied to the polyethylene terephthalate substrate at a thickness of 20-30 micrometers. The epoxy-based primer was then allowed to cure at room temperature over a period of 48 hours.

DesoThane 8800, available from PPG Aerospace, Pittsburgh, Pa., was selected as the polyurethane topcoat. DesoThane 8800 comprises a base component, and activator component, and a thinner component. The base component comprises 2-oxypanone, polymer with 2, 2-bis (hydroxymethyl)-1, 3-propanediol, methyl amyl ketone, and styrene acrylic polymer. The activator comprises a homopolymer of hexamethylene diisocyanate. The thinner component comprises methyl amyl ketone, and ethyl acetate.

The polyurethane topcoat was prepared in a 2:1:1 mix ratio, by volume, of base component to activator component, to thinner. The polyurethane topcoat was then applied to the epoxy-based primer at a thickness of 50-75 micrometers. The polyurethane topcoat was then allowed to cure at room temperature over a period of 48 hours.

After mixing the polyurethane and epoxy coatings, liquid samples were measured for cure characteristics in Differential Scanning calorimetry (DSC) using a Netzsch DSC-200 with a Netzsch TASC 414/3 controller (Netzsch Instruments, Burlington, Mass.). Samples were heated in aluminum DSC crucibles at 2° C. per minute from 30° C. to 200° C. Cured solid epoxy and polyurethane samples were also tested using the same program to measure any residual or incomplete cure behavior.

Cured epoxy films, both with and without dyes, exhibit none of these behaviors, showing smooth curves with no exothermic or endothermic events. Therefore, the present example does not interfere with the completion of cure or solvent evaporation in the epoxy primer coating at these concentrations.

Example 3

A coating system of an epoxy based primer and a polyurethane topcoat was prepared on a 0.1 millimeter polyethylene terephthalate substrate. DesoPrime 7501, available from PPG Aerospace, Pittsburgh, Pa., was selected as the epoxy-based primer. DesoPrime 7501 comprises a curing agent and epoxy monomers. The curing agent is a mixture of paint solids, n-butyl alcohol, and aliphatic amines. The epoxy monomer comprises bisphenyl A and Epichlorohydrin-based resin in an acetone solvent.

The epoxy-based primer was prepared in a 1:1 mix ratio, by volume, of curing agent to epoxy monomers. The epoxy-based primer was then applied to the polyethylene terephthalate substrate at a thickness of 20-30 micrometers. The epoxy-based primer was then allowed to cure at room temperature over a period of 48 hours.

DesoThane 8800, available from PPG Aerospace, Pittsburgh, Pa., was selected as the polyurethane topcoat. DesoThane 8800 comprises a base component, and activator component, and a thinner component. The base component comprises 2-oxypanone, polymer with 2, 2-bis (hydroxymethyl)-1, 3-propanediol, methyl amyl ketone, and styrene acrylic polymer. The activator comprises a homopolymer of hexamethylene diisocyanate. The thinner component comprises methyl amyl ketone, and ethyl acetate.

A modified stilbene-type fluorescent dyes were synthesized and prepared as a dry powder. The modified stilbene-type molecules were prepared having tetra-butyl dimethyl silane end groups. The selected end groups were selected to be non-reactive with other components of the polyurethane topcoat. The modified stilbene-type fluorescent dye was added to the thinner component in an amount of $6.3*10^{-4}$ mol/L of the thinner component, which was measured using a conventional fluorescence probe (probe 6 shown in FIG. 14).

The polyurethane topcoat was prepared in a 2:1:1 mix ratio, by volume, of base component to activator component, to thinner. The polyurethane topcoat was then applied to the epoxy-based primer at a thickness of 50-75 micrometers. The polyurethane topcoat was then allowed to cure at room temperature over a period of 48 hours.

Example 4

A coating system of an epoxy based primer and a polyurethane topcoat was prepared on a 0.1 millimeter polyethylene terephthalate substrate. DesoPrime 7501, available from PPG Aerospace, Pittsburgh, Pa., was selected as the epoxy-based primer. DesoPrime 7501 comprises a curing agent and epoxy monomers. The curing agent is a mixture of paint solids, n-butyl alcohol, and aliphatic amines. The epoxy monomer comprises bisphenyl A and Epichlorohydrin-based resin in an acetone solvent.

The epoxy-based primer was prepared in a 1:1 mix ratio, by volume, of curing agent to epoxy monomers. The epoxy-based primer was then applied to the polyethylene terephthalate substrate at a thickness of 20-30 micrometers. The epoxy-based primer was then allowed to cure at room temperature over a period of 48 hours.

DesoThane 8800, available from PPG Aerospace, Pittsburgh, Pa., was selected as the polyurethane topcoat. DesoThane 8800 comprises a base component, and activator component, and a thinner component. The base component comprises 2-oxypanone, polymer with 2, 2-bis (hydroxymethyl)-1, 3-propanediol, methyl amyl ketone, and styrene acrylic polymer. The activator comprises a homopolymer of hexamethylene diisocyanate. The thinner component comprises methyl amyl ketone, and ethyl acetate.

A modified stilbene-type fluorescent dyes were synthesized and prepared as a dry powder. The modified stilbene-type molecules were prepared having hydroxyl end groups. The selected end groups were selected to be reactive with other components of the polyurethane topcoat. Specifically, the hydroxyl end groups react with the isocyanate group of the pre-polyurethane monomers and become incorporated into the polyurethane chain. The modified stilbene-type fluorescent dye was added to the thinner component in an amount of $7.4*10^{-4}$ mol/L of the thinner component, which was measured using a conventional fluorescence probe (probe 7 shown in FIG. 14).

The polyurethane topcoat was prepared in a 2:1:1 mix ratio, by volume, of base component to activator component, to thinner. The polyurethane topcoat was then applied to the epoxy-based primer at a thickness of 50-75 micrometers. The polyurethane topcoat was then allowed to cure at room temperature over a period of 48 hours.

Cure Characteristics

After mixing the polyurethane and epoxy coatings, liquid samples were measured for cure characteristics in Differential Scanning calorimetry (DSC) using a Netzsch DSC-200 with a Netzsch TASC 414/3 controller (Netzsch Instruments, Burlington, Mass.). Samples were heated in aluminum DSC crucibles at 2 C per minute from 30 C to 200 C. Cured solid epoxy and polyurethane samples were also tested using the same program to measure any residual or incomplete cure behavior.

Figure 13:
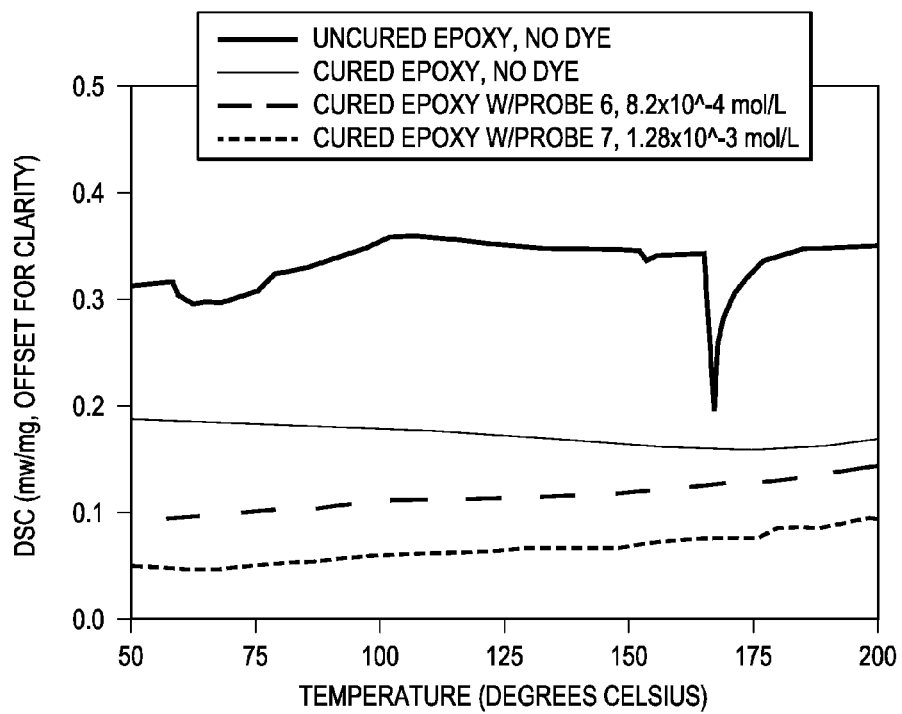
FIG. 13 shows the Differential Scanning calorimetry scans resulting from measurements of uncured and cured epoxy films in accordance with an advantageous embodiment.

FIG. 13 shows the Differential Scanning calorimetry scans resulting from measurements of uncured and cured epoxy films prepared in Example 1 and Example 2.

Figure 14:
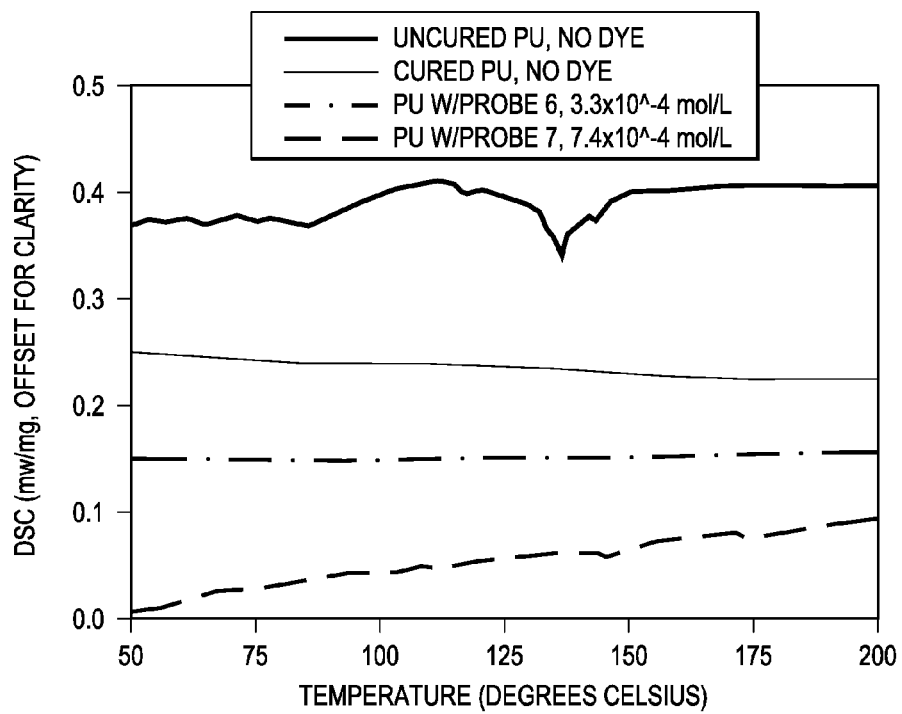
FIG. 14 shows the Differential Scanning calorimetry scans resulting from measurements of uncured and cured polyurethane coatings in accordance with an advantageous embodiment.

FIG. 14 shows the Differential Scanning calorimetry scans resulting from measurements of uncured and cured PU coatings prepared in Example 3 and Example 4.

Cured polyurethane films, both with and without dyes, do not exhibit either exothermic or endothermic behavior. Just as in epoxy coatings, this is taken as evidence that the dye molecules at these concentrations do not unduly hinder the polymerization reaction or the solvent evaporation.

Glass Transition Temperatures

Glass transition temperatures of the coatings were determined using Dynamic Mechanical Analysis (DMA) performed in a PerkinElmer DMA 7e instrument (PerkinElmer Life and Analytical Sciences, Inc., Waltham, Mass.). Cured samples of coatings 1.-0.3 mm in thickness were removed from the PET film. Samples were tested in the DMA for glass transition in 3-point bend configuration with a 10 mm span length. Temperature scans were performed from −50 C to 50 C. 5 samples of each coating and dye combination were tested, and statistical analysis was performed using Student's T-test.

Figure 15:
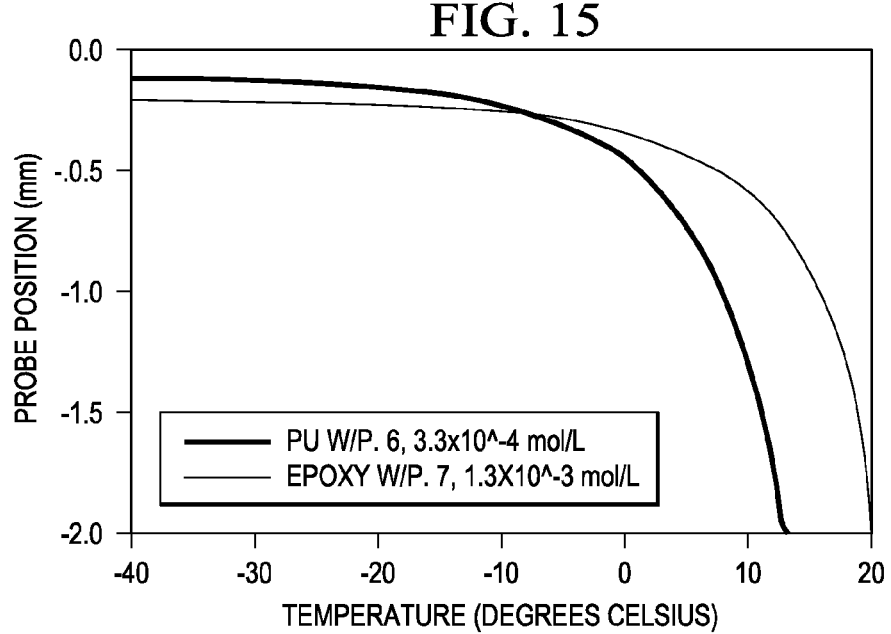
FIG. 15 shows representative plots of the Differential Scanning calorimetry scans taken for epoxy and polyurethane coatings within the incorporated stilbene-type fluorescent dyes in accordance with an advantageous embodiment.

FIG. 15 shows representative plots of the Differential Scanning calorimetry scans taken for epoxy and polyurethane coatings within the incorporated stilbene-type fluorescent dyes.

Figure 16:
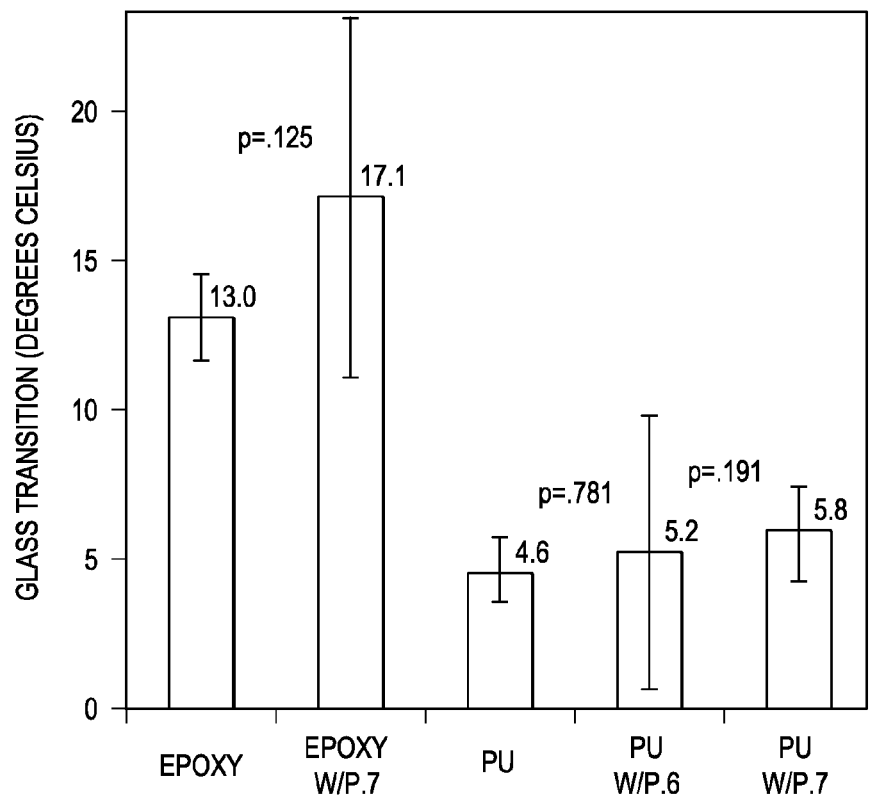
FIG. 16 shows Glass transition temperature measurements of epoxy and polyurethane coatings with and without the incorporated stilbene-type fluorescent dyes in accordance with an advantageous embodiment.

FIG. 16 shows Glass transition temperature measurements of epoxy and polyurethane coatings with and without the incorporated stilbene-type fluorescent dyes. While the dyes appear to cause a slight increase in $T_g$, the variances of the sample sets do not allow that conclusion to be drawn. P-values resulting from a 2-tailed Student's T-test comparing $T_g$ values are shown in the plot. Student's T-test requires p-values to be below at least 0.05 to conclude that two distributions came from different sample sets. Accordingly, the presence of stilbene-type fluorescent dyes in the epoxy and polyurethane coatings at the shown concentrations did not affect the glass transition of the coatings.

Absorbance Spectra

Photoluminescent quantum yield (PLQY) and fluorescence emission spectra were collected using a Hamamatsu Absolute PL Quantum Yield Measurement System available from Hamamatsu K.K. Quantum yield values and PL emission spectra were measured using a fiber optic LED illumination source in an integrating sphere. The illumination wavelength chosen was the maximum absorbance wavelength of the solid polyurethane (PU) films, $\lambda=498$ nm. Each sample was exposed for 44 µs, and results were averaged 200 times. Samples from various locations within the gage length of the tensile specimen were tested. The quantum yield values and peak emission wavelengths were averaged for each tensile specimen.

FIG. 17 shows the absorbance spectra for the tetra-butyl dimethyl silane functionalized stilbene dyes at various concentrations in the "thinner" precursor of the polyurethane coating.

FIG. 18 shows the absorbance spectra for the hydroxyl functionalized stilbene dyes at various concentrations in the "thinner" precursor of the polyurethane coating.

The absorbance spectra of the dyes at various concentrations in liquid dioxin of the epoxy and the methyl amyl ketone, ethyl acetate of the polyurethane was collected for a range including the visible, 250-1100 nm. Spectra were normalized about the dimer absorbance peak wavelength and offset to 0 A at 800 nm, well beyond the absorbance activity.

FIG. 19 shows the absorbance of the tetra-butyl dimethyl silane functionalized stilbene dyes in solid polyurethane films on glass substrates.

The absorbance spectra of the dyes in solid PU films on glass were collected over the same range as in liquid solvents. Film thicknesses were measured and spectra were scaled by the film thickness, and offset to 0 A at 800 nm. It was not possible to collect spectra from dyes in the epoxy primer due to the large percentage of paint solids, which scattered or absorbed the incident illumination much too strongly.

Spectra were scaled for variations in film thickness. The hydroxyl functionalized stilbene dyes shows similar absorbance data. The dimer absorbance peak at $\lambda=498$ nm shows strongly in the solid coatings, indicating that dyes exist in the aggregate state within the solid. The monomer peak at $\lambda=395$ nm is only weakly visible in the highest concentration of dye. This is partially attributed to the strong absorbance of the polyurethane film itself at wavelengths at or below about 400 nm.

Tensile Testing & Fluorescence Imaging

Figure 20:
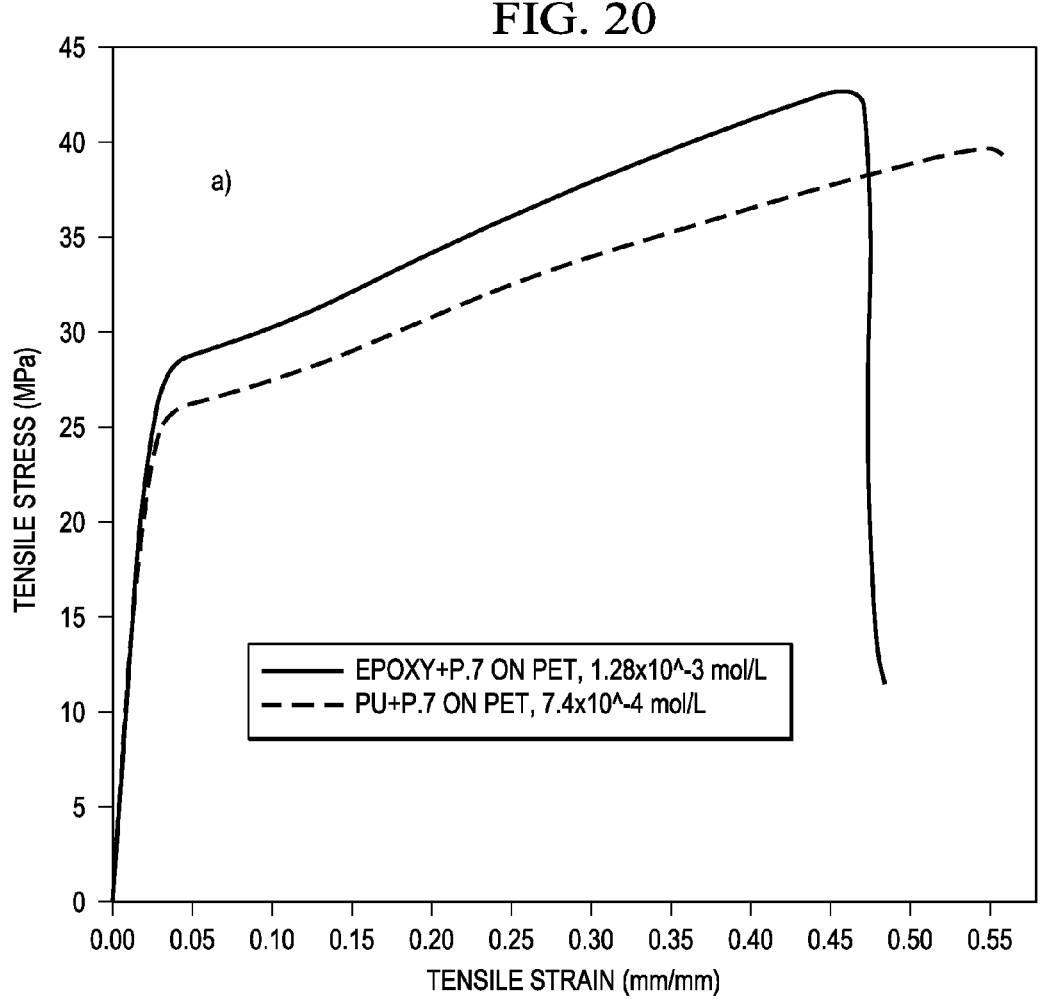
FIG. 20 shows typical stress-strain curves for the PET-epoxy and PET-polyurethane bilayers in accordance with an advantageous embodiment.

FIG. 20 shows typical stress-strain curves for the PET-epoxy and PET-polyurethane bilayers.

Figure 21:
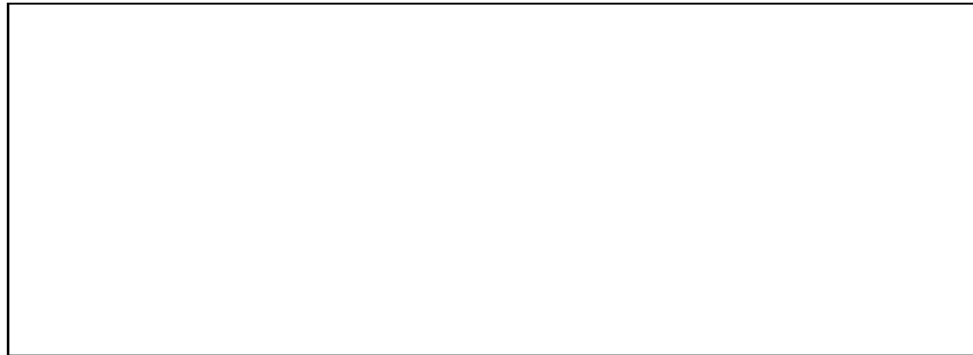
FIG. 21 shows images from a tensile stress test of hydroxyl functionalized stilbene dyes in an epoxy film in accordance with an advantageous embodiment.

FIG. 21 shows images from a tensile stress test of hydroxyl functionalized stilbene dyes in an epoxy film at $1.28 \times 10^{-3}$ mol/L.

The fluorescent images of hydroxyl functionalized stilbene dyes in epoxy show the fluorescence intensity increasing and also shifting wavelength, from reddish-orange to a more light orange color, a shift to lower wavelength emissions. This is consistent with the molecular behavior of the stilbene dyes. When a large number P hydroxyl functionalized stilbene molecules are cross-linked on one side to the coating polymer networks, tensile stress can cause a reduction in aggregation of the stilbene molecules. This reduction increases the relative monomer absorption and emission, resulting in an overall lower wavelength of emitted fluorescence.

Figure 22:
FIG. 22 shows images from a tensile stress test of hydroxyl functionalized stilbene dyes in a polyurethane film in accordance with an advantageous embodiment

FIG. 22 shows images from a tensile stress test of hydroxyl functionalized stilbene dyes in a polyurethane film at $7.4 \times 10^{-4}$ mol/L.

The images of hydroxyl functionalized stilbene dyes in polyurethane emit more intensely at the highest level of strain than hydroxyl functionalized stilbene dyes in epoxy. This more intense emission is consistent with a shift to higher energy monomeric absorption and emission.

As previously discussed, the advantageous embodiments herein functionalize coatings and topcoats that are applied to the surface of the aircraft during manufacturing, such as described in aircraft manufacturing and service method 100 as shown in FIG. 1. Composite aircraft parts are sprayed with a compatible primer, then painted with the airline logo, then sprayed with a protective topcoat. Fluorescent dye molecules whose fluorescent behaviors change in response to external stress or deformation stimuli are incorporated into these aircraft coatings to create a fluorescent sensor or "witness" coating for inconsistencies that are barely visible to a visual inspection. The use of these dyes allows rapid, low cost inspection of large areas of an aircraft or other structure for inconsistencies.

Highly efficient, aggregation-sensitive dyes with intrinsic dipole moments are selected and functionalized with end groups to either promote or prevent combination with coating polymer networks. When stress is applied to the coating, the positions of the dye molecules will shift as the polymer network displaces. The applied stress will change the dyes' aggregation behavior, and change their fluorescence behavior as a result.

The description of the different advantageous embodiments has been presented for purposes of illustration and description, and is not intended to be exhaustive or limited to the embodiments in the form disclosed. Many modifications and variations will be apparent to those of ordinary skill in the art.

For example, although an advantageous embodiment has been described with respect to aircraft, the advantageous embodiment may be applied to other types of platforms that may have composite structures. For example, without limitation, other advantageous embodiments may be applied to a mobile platform, a stationary platform, a land-based structure, an aquatic-based structure, a space-based structure and/or some other suitable object. More specifically, the different advantageous embodiments may be applied to, for example, without limitation, a submarine, a bus, a personnel carrier, tank, a train, an automobile, a spacecraft, a space station, a satellite, a surface ship, a power plant, a dam, a manufacturing facility, a building and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A coating system comprising:
   at least one polymeric coating layer comprising a fluorescent dye, wherein an optical behavior of the fluorescent dye changes as a function of a stress of the at least one polymeric coating layer, wherein the at least one polymeric coating layer comprises a primer layer, wherein the primer layer is an epoxy thermoset formed from a curing agent and epoxy monomers in a solvent.

2. The coating system of claim 1, wherein the fluorescent dye is based on a modified stilbene-type fluorescent molecule.

3. The coating system of claim 1, wherein the at least one polymeric coating layer includes a topcoat layer.

4. The coating system of claim 3, wherein:
   the fluorescent dye is added to the solvent prior to curing the primer layer, and
   the primer layer has a thickness of between 20 micrometers and 30 micrometers.

5. The coating system of claim 1, wherein the fluorescent dye includes functional end groups that do not react with the epoxy monomers.

6. The coating system of claim 5, wherein the functional end groups are tetra-butyl dimethyl silane end groups.

7. The coating system of claim 1, wherein the curing agent comprises paint solids, n-butyl alcohol, and aliphatic amines, wherein the epoxy monomers comprise bisphenyl A and epichlorohydrin, and wherein the solvent comprises acetone.

8. The coating system of claim 4, wherein the fluorescent dye includes hydroxyl end groups.

9. The coating system of claim 1, wherein the fluorescent dye is present in the solvent at a concentration of between an amount of $0.05*10^{-5}$ moles of fluorescent dye per liter of solvent and an amount of $10*10^{-5}$ moles of fluorescent dye per liter of solvent.

10. The coating system of claim 3, wherein the topcoat layer is a polyurethane formed from:
    a base component comprising diol groups,
    a base activator group comprising isocyanate groups, and
    a thinner component comprising a solvent, wherein the fluorescent dye includes tetra-butyl dimethyl silane end groups.

11. The coating system of claim 10, wherein:
    the base component comprises 2-oxypanone, 2,2-bis(hydroxymethyl)-1,3-propanediol, methyl amyl ketone, and styrene acrylic polymer,
    the base activator group comprises a homopolymer of hexamethylene diisocyanate, and
    the fluorescent dye includes functional end groups that react with the diol groups or the isocyanate groups.

12. A composite structure, comprising:
    a plurality of laminated composite plies, including a top ply, wherein the top ply includes a fluorescent dye having an optical behavior that changes as a function of a stress applied to the top ply, wherein the fluorescent dye includes functional end groups that do not react with epoxy monomers.

13. The composite structure of claim 12, wherein the fluorescent dye is based on a modified stilbene-type fluorescent molecule.

14. The composite structure of claim 12, wherein:
    the top ply includes a fiberous reinforcement impregnated with a polymeric resin, and
    the fluorescent dye is distributed throughout the polymeric resin.

15. The composite structure of claim 12, further comprising a coating comprising an epoxy thermoset formed from the epoxy monomers.

16. The composite structure of claim 12, wherein the functional end groups are tetra-butyl dimethyl silane end groups.

17. A method of coating a vehicle, the method comprising:
    applying a primer layer;
    applying a topcoat layer, wherein at least one of the primer layer and the topcoat layer includes a fluorescent dye having an optical behavior that changes as a function of a stress applied to the at least one of the primer layer and the topcoat layer; and
    wherein the primer layer is an epoxy thermoset formed from a curing agent and epoxy monomers in a solvent.

18. The method of claim 17, wherein:
    the curing agent comprises paint solids, n-butyl alcohol, and aliphatic amines, wherein the epoxy monomers comprise bisphenyl A and epichlorohydrin, and
    the solvent comprises acetone.

19. The method of claim 18, wherein the fluorescent dye is based on a modified stilbene-type fluorescent molecule.

20. The method of claim 17, wherein the fluorescent dye includes functional end groups that do not react with the epoxy monomers.

21. The method of claim 20, wherein the functional end groups are hydroxyl end groups.

22. A method of detecting inconsistencies in a composite structure comprising:
    forming an epoxy thermoset from a curing agent and epoxy monomers in a solvent;
    applying a stress sensitive coating to the composite structure, wherein the stress sensitive coating comprises the epoxy thermoset; and
    detecting changes in a stress profile of the stress sensitive coating.

23. The method of claim 22, wherein applying the stress sensitive coating includes introducing a fluorescent dye having an optical behavior that changes as a function of a stress applied to the stress sensitive coating, wherein the fluorescent dye includes functional end groups that do not react with the epoxy monomers.

24. The method of claim 23, wherein detecting changes in the stress profile of the stress sensitive coating includes:
- obtaining an initial stress profile for the stress sensitive coating,
- obtaining a current stress profile for the stress sensitive coating, and
- identifying a stress difference between the initial stress profile and the current stress profile.

25. The method of claim 22, wherein detecting changes in the stress profile of the stress sensitive coating is performed by collecting photoluminescent quantum yield and fluorescence emission spectra from the stress sensitive coating.

* * * * *